United States Patent
Helmbrecht

(10) Patent No.: US 7,019,434 B2
(45) Date of Patent: Mar. 28, 2006

(54) DEFORMABLE MIRROR METHOD AND APPARATUS INCLUDING BIMORPH FLEXURES AND INTEGRATED DRIVE

(75) Inventor: Micheal Albert Helmbrecht, Lafayette, CA (US)

(73) Assignee: Iris AO, Inc., Berkeley, CA (US)

( * ) Notice: Subject to any disclaimer, the term of this patent is extended or adjusted under 35 U.S.C. 154(b) by 0 days.

(21) Appl. No.: 10/703,391

(22) Filed: Nov. 7, 2003

(65) Prior Publication Data

US 2004/0165243 A1    Aug. 26, 2004

Related U.S. Application Data

(60) Provisional application No. 60/425,049, filed on Nov. 8, 2003, provisional application No. 60/425,051, filed on Nov. 8, 2003.

(51) Int. Cl.
*H02N 1/00*    (2006.01)

(52) U.S. Cl. .......................... 310/309; 310/306

(58) Field of Classification Search ........... 248/346.01, 248/548, 549, 466, 474, 476; 310/309, 306, 310/32; 359/223, 224
See application file for complete search history.

(56) References Cited

U.S. PATENT DOCUMENTS

| | | | |
|---|---|---|---|
| 6,128,122 A | 10/2000 | Drake et al. | |
| 6,625,004 B1* | 9/2003 | Musolf et al. | 361/278 |
| 6,759,787 B1* | 7/2004 | Miller et al. | 310/309 |
| 2001/0050618 A1 | 12/2001 | Dummermuth | |
| 2002/0050167 A1 | 5/2002 | Foote et al. | |
| 2004/0180465 A1* | 9/2004 | Musolf et al. | 438/52 |
| 2004/0240032 A1 | 12/2004 | Miles | |

FOREIGN PATENT DOCUMENTS

| JP | 2001249285 | 9/2001 |
|---|---|---|
| US | 6315423 | 11/2001 |
| US | 6543286 | 4/2003 |
| WO | WO 00/55666 A1 | 9/2000 |

* cited by examiner

*Primary Examiner*—Kimberly Wood
*Assistant Examiner*—Amy J. Sterling
(74) *Attorney, Agent, or Firm*—Stattler Johansen & Adeli, LLP

(57) ABSTRACT

An apparatus comprising a substrate; and a platform elevated above the substrate and supported by curved flexures. The curvature of said flexures results substantially from variations in intrinsic residual stress within said flexures. In one embodiment the apparatus is a deformable mirror exhibiting low temperature-dependence, high stroke, high control resolution, large number of degrees of freedom, reduced pin count and small form-factor. Structures and methods of fabrication are disclosed that allow the elevation of mirror segments to remain substantially constant over a wide operating temperature range. Methods are also disclosed for integrating movable mirror segments with control and sense electronics to a produce small-form-factor deformable mirror.

11 Claims, 14 Drawing Sheets

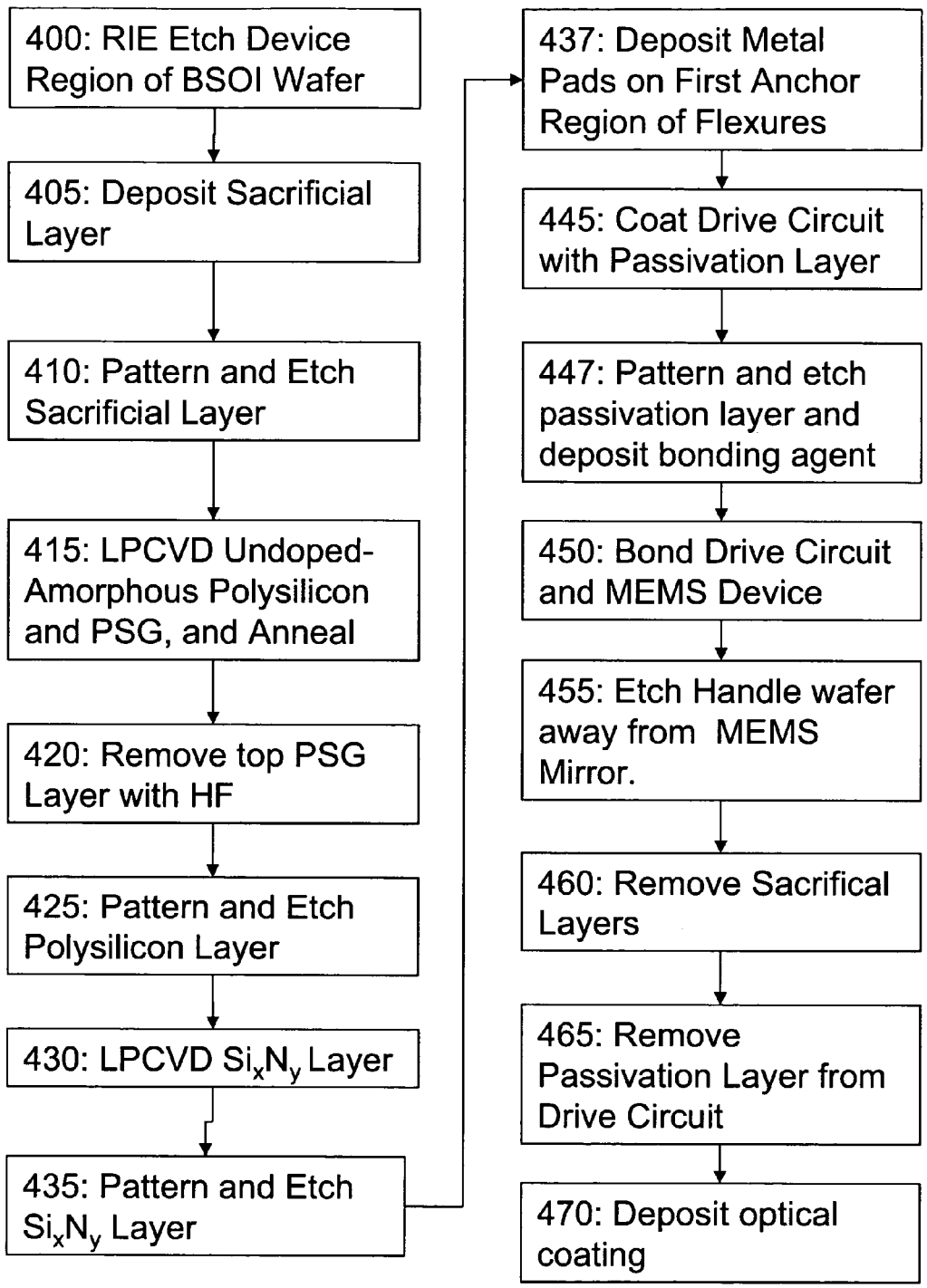
FIGURE: 4A

400
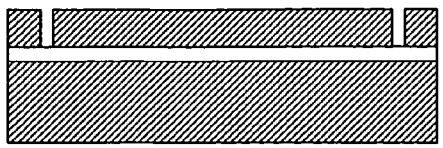
405
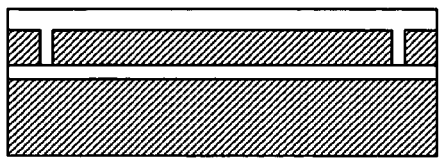
410
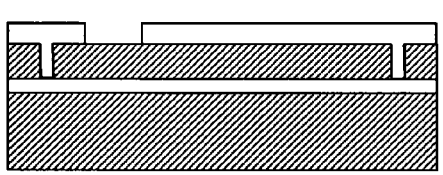
415
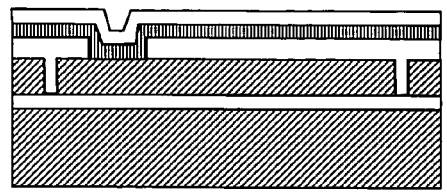
420
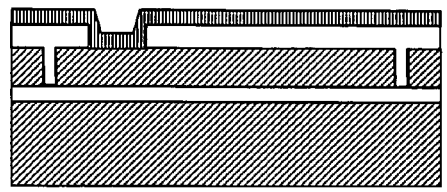
425
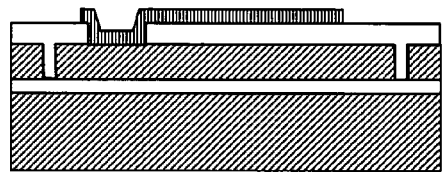
430
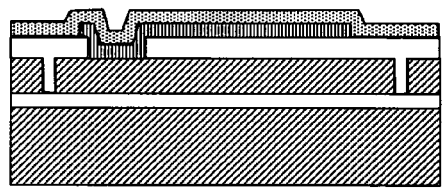
435
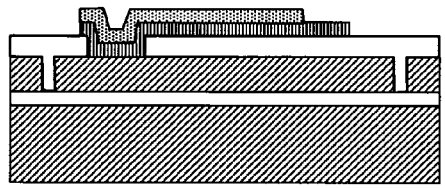
437
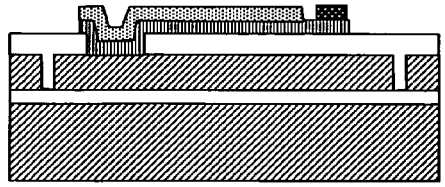
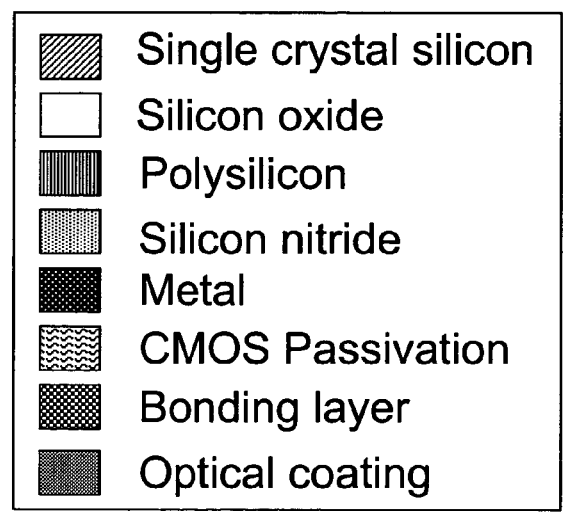
- Single crystal silicon
- Silicon oxide
- Polysilicon
- Silicon nitride
- Metal
- CMOS Passivation
- Bonding layer
- Optical coating
FIGURE: 4B - 1

445
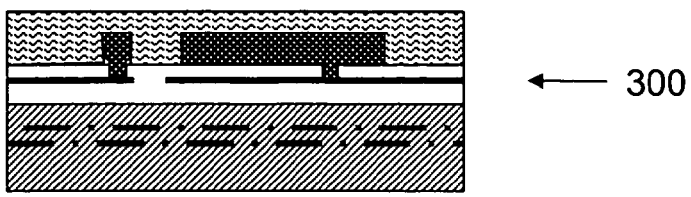
← 300
447
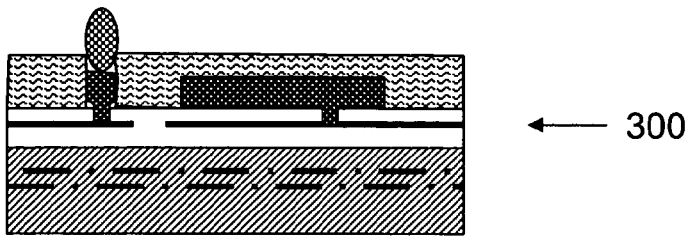
← 300
450
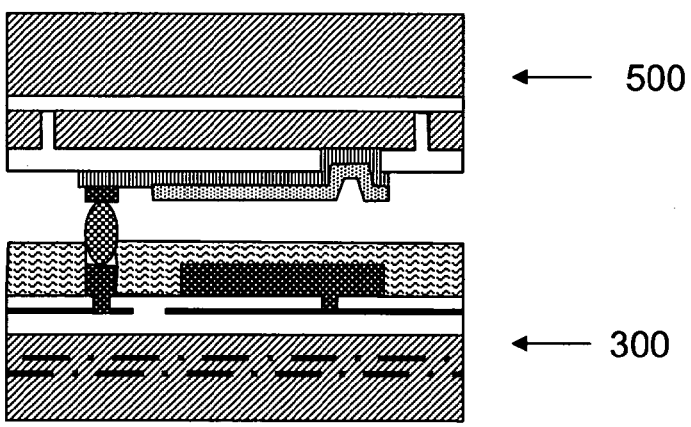
← 500
← 300
455
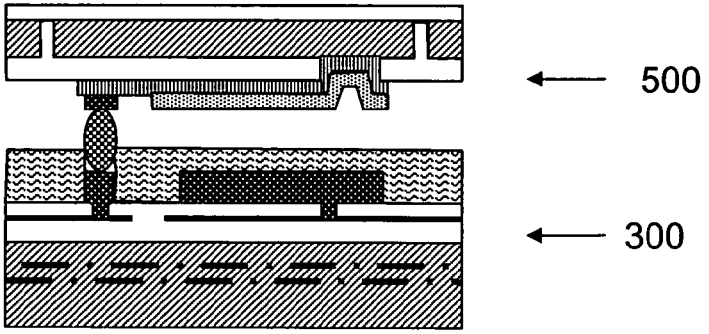
← 500
← 300
FIGURE: 4B - 2

460
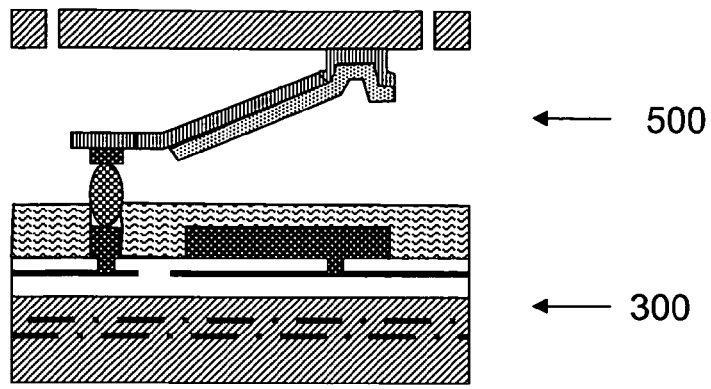
← 500
← 300
465
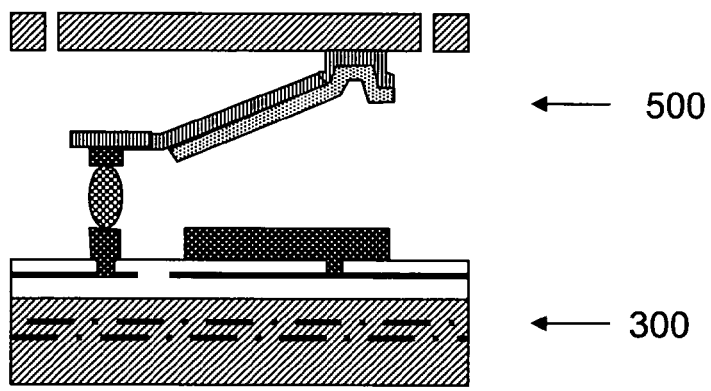
← 500
← 300
470
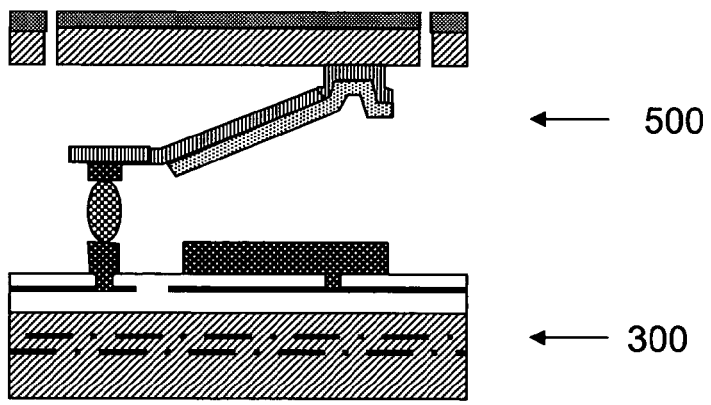
← 500
← 300
FIGURE: 4B - 3

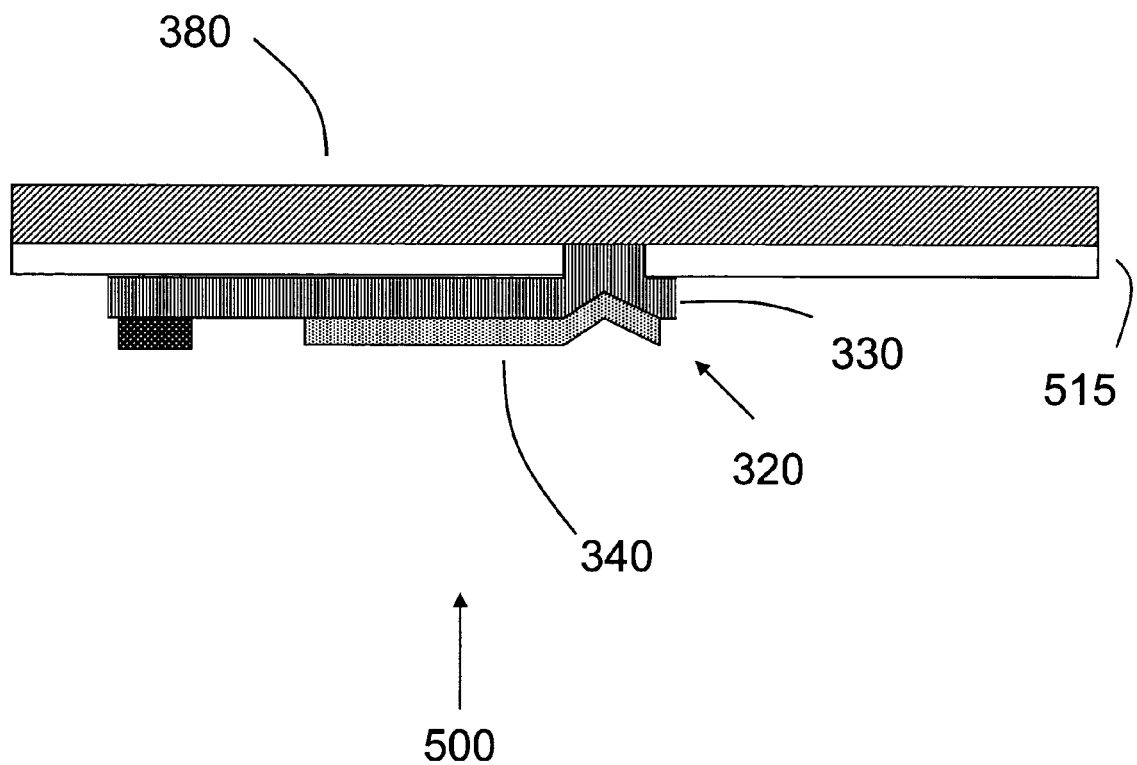
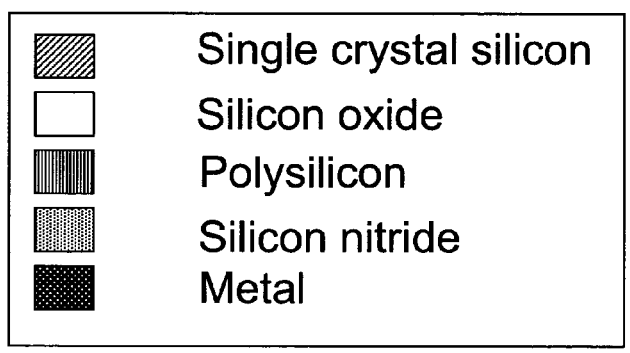
FIGURE 5

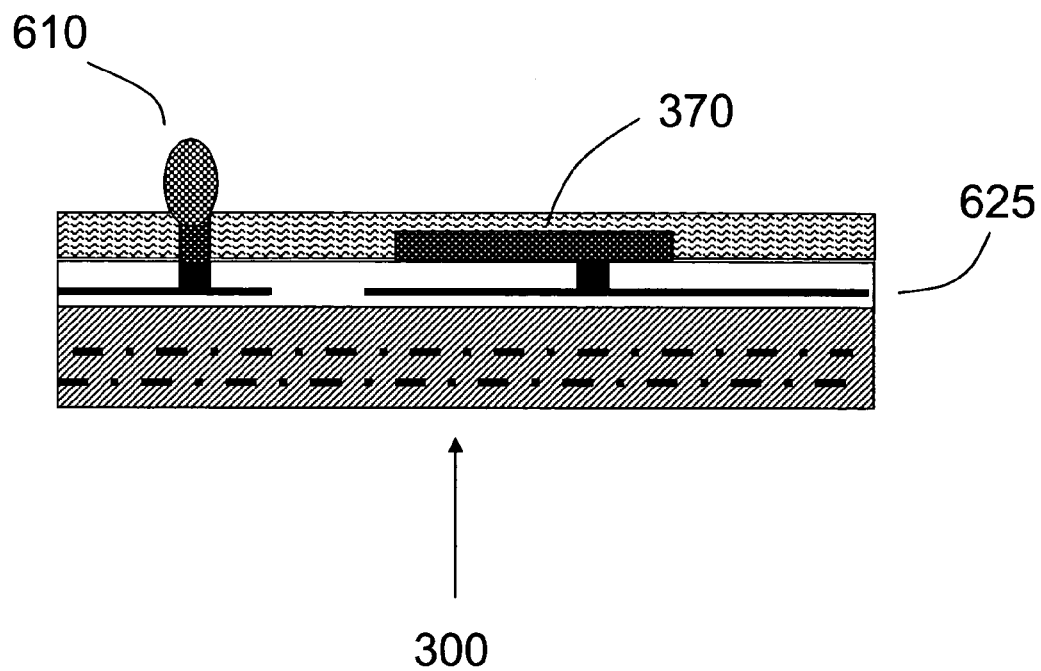
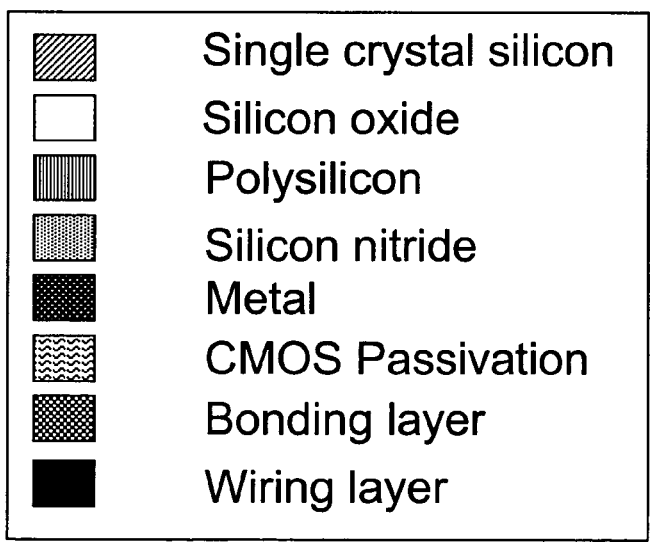
FIGURE 6

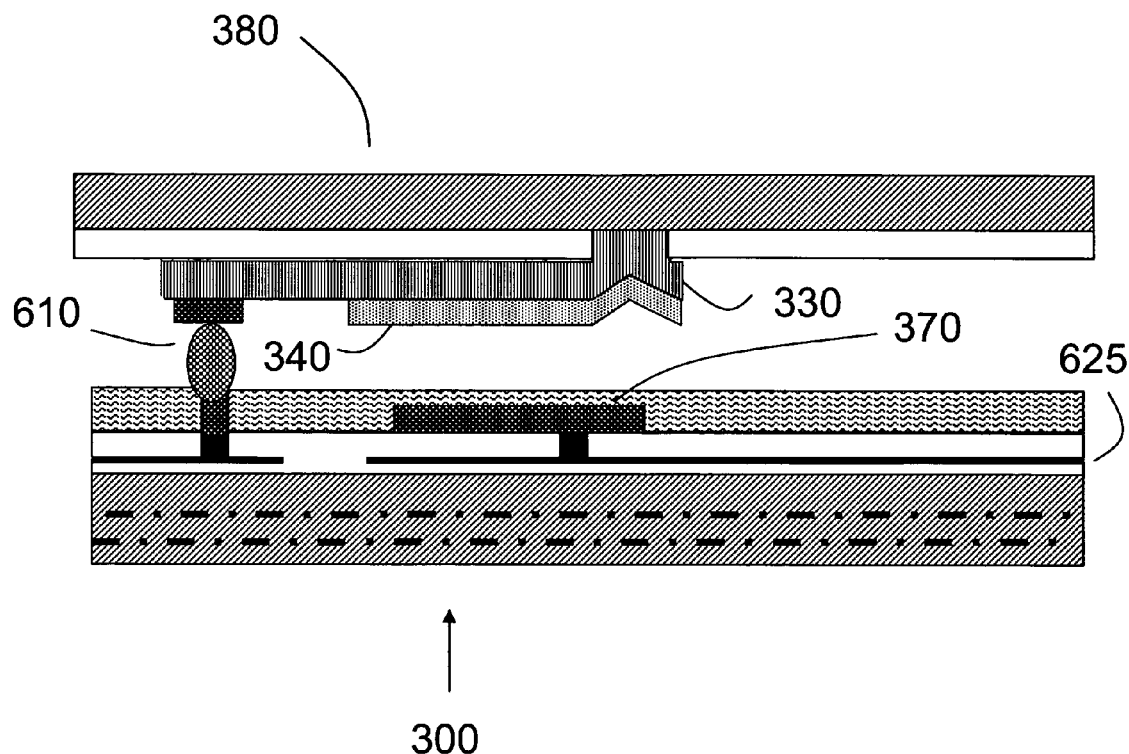
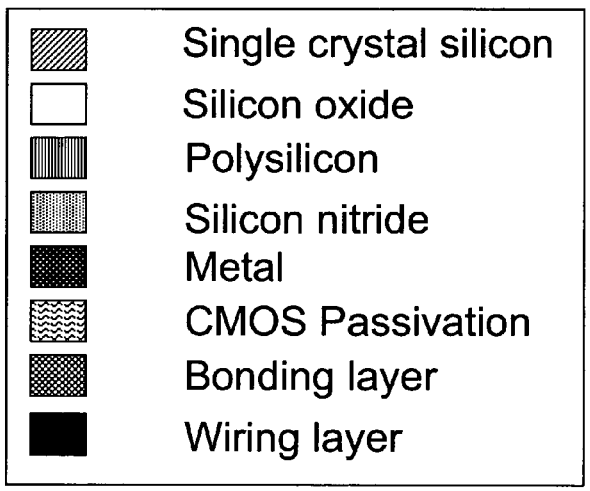
FIGURE 7A

| Material | CTE (ppm/°C) |
|---|---|
| Silicon | 2.6 |
| $Si_3N_4$ | 2.8 |
| SiC | 4.3 |
| AlN | 4 |
| Ni | 13.4 |
| $SiO_2$ | 0.55 |

FIGURE 8

DEFORMABLE MIRROR METHOD AND APPARATUS INCLUDING BIMORPH FLEXURES AND INTEGRATED DRIVE

CROSS-REFERENCE TO RELATED APPLICATIONS

This application claims the benefit of U.S. Provisional Patent Application No. 60/425,049 entitled Reduced Rotation MEMS Deformable Mirror Apparatus and Method, and U.S. Provisional Patent Application No. 60/425,051 entitled Deformable Mirror Method and Apparatus Including Bimorph Flexures and Integrated Drive, both filed Nov. 8, 2002.

BACKGROUND OF THE INVENTION

1. Field of the Invention

This invention relates to a methods and structures for elevating a platform above a substrate and for producing a controlled motion of that platform. It also relates to MEMS deformable mirror ("DM") arrays, and more particularly to long-stroke MEMS deformable mirror arrays for adaptive optics applications.

2. Description of the Related Art

Adaptive optics ("AO") refers to optical systems that adapt to compensate for disadvantageous optical effects introduced by a medium between an object and an image formed of that object. Horace W. Babcock proposed the concept of adaptive optics in 1953, in the context of mirrors capable of being selectively deformed to correct an aberrated wavefront. See John W. Hardy, Adaptive optics for astronomical telescopes, Oxford series in optical and imaging sciences 16, Oxford University Press, New York, 1998. Since then, deformable mirrors (DM) have been proposed for a variety of AO applications, although they have yet to be implemented in many such proposed applications.

The general operation of a DM is shown schematically in FIG. 1, in which a DM 100 reflects an aberrated wavefront 105, resulting in a desired planar wavefront 110. The DM shape is dynamically adapted to correct the path-length variations of the inbound aberrated wavefront. That is, by selectively deforming the mirror to decrease or increase the path length for specific portions of the aberrated wavefront, the aberrations in the reflected wavefront are corrected. The amount of local displacement needed of the DM surface is generally approximately equal to half the path-length variations in the aberrated wavefront. The exact scale factor depends on the angle at which the aberrated wavefront strikes the deformable mirror.

A prior art AO system is shown schematically in FIG. 2. This example is particularly related to an astronomical telescope application, but the general principles of AO shown here are illustrative of other applications. In FIG. 2, an aberrated wavefront 105 enters the optical system 205 where it is modified as it reflects off a DM 100. Aberrations in the wavefront reflected from the DM are the error signal for a computer-controlled feedback loop. The reflected wavefront 110 enters a dichroic beam splitter 220; the infrared wavelengths pass to a science camera 225 and the visible wavelengths reflect toward a wavefront sensor 230. The wavefront sensor measures the wavefront slope at discrete points and sends these data to a wavefront reconstructor 235. The wavefront reconstructor 235 determines the remaining wavefront aberrations in the corrected wavefront. An actuator control block 240 calculates actuator drive signals to correct the remaining wavefront errors, which are sent from the block 240 to the DM 100, thus closing the feedback loop. In this way, the DM is continuously driven in such a way as to minimize the aberrations in the reflected wavefront, thereby improving image resolution at the science camera.

AO systems have been proposed and demonstrated for improving resolution in a number of imaging applications. In astronomy, for example, AO has been used to correct aberrations introduced by motion of the atmosphere, allowing ground-based telescopes to exceed the resolution provided by the Hubble Space Telescope under some observing conditions. In the field of vision science, AO has been shown to offer benefits, for example, for in-vivo retinal imaging in humans. Here, AO systems can compensate for the aberrations introduced by the eye, improving lateral image resolution by a factor of three and axial resolution by a factor of ten in confocal imagers. This has allowed individual cells to be resolved in living retinal tissue, a capability that was not present before the advent of AO.

In addition to improving image resolution, AO systems can be used to improve confinement of a projected optical beam traveling through an aberrating medium. Examples of applications in this category are free-space optical communication, optical data storage and retrieval, scanning retinal display, and laser-based retinal surgery.

A number of characteristics are commonly used to compare performance of DM designs. Fill-factor is the fraction of the DM aperture that is actively used to correct wavefront aberrations. Mirror stroke is the amount of out-of-plane deformation that can be induced in the DM surface. The number of degrees-of-freedom is a measure of the spatial complexity of the surface shapes the DM is capable of assuming and is related to the number of individual actuators that are used to deform the mirror surface. DM aperture diameter, DM device size, control resolution, operating temperature range, power consumption, frequency response and price are also generally considered when selecting a DM for a given application. For example, astronomical imaging typically requires mirror stroke in the range of a few micrometers, frequency responses in the kilohertz range and aperture sizes on the order of a few centimeters to a few meters. Systems for imaging structures in the human eye, by contrast, generally require mirror stroke on the order of 10 micrometers or greater, frequency responses in the tens to hundreds of Hertz range, and aperture sizes on the order of one centimeter or less.

Despite the advantages outlined above, AO has not been universally adopted, even in the aforementioned applications. Two important factors that have impeded the widespread adoption of AO are the high cost and limited stroke of available DMs.

DM designs can be broadly divided into two classes; continuous-face-sheet designs and segmented designs. Continuous-face-sheet DMs have a reflective surface that is continuous over their whole aperture. The surface is deformed using actuators, typically mounted behind it, that push or pull on it to achieve a desired deformation. This type of DM has been implemented, for example, by mounting an array of piezoelectric actuators to the rear surface of a somewhat flexible glass or ceramic mirror. Because the optical surface is continuous and rather inelastic, large actuation forces are required to deform the mirror, and the resulting mirror stroke is small, typically less than 5 micrometers. The continuous surface also means that the deformation produced by each actuator is not tightly confined to the area of the mirror directly connected to it, but instead may extend across the whole mirror aperture, making precise control of the overall mirror deformation problematic. Because of the way they are constructed, such DMs are also comparatively large, having apertures on the order of 50 mm or greater. This large size precludes their deployment in many optical systems that might otherwise benefit from AO. Their fabrication methods also make these DMs expensive to manufacture and do not permit easy integration of control electronics into the DM structure.

A number of continuous-face-sheet DMs using microfabrication techniques that offer the potential to reduce DM size and cost have been created. Vdovin and Sarro, in "Flexible mirror micromahined in silicon", Applied Optics, vol. 34, no. 16 (1995), disclose a DM fabricated by assembling a metalcoated silicon nitride membrane above an array of electrodes that are used to deform the membrane by electrostatic attraction.

Bifano et al. disclose an alternative microfabricated continuous-face-sheet DM in "Microelectromechanical Deformable Mirrors", IEEE Journal of Selected Topics in Quantum Electronics, vol. 5 no. 1 (1999). Their design relies on the removal of a sacrificial layer to create cavities underneath the mirror surface that define the maximum travel range of each mirror actuator. U.S. Pat. No. 6,384,952 to Clark et al. (2002) discloses a continuous-face-sheet DM that employs a mirrored membrane fabricated, for example, from metalcoated silicon nitride and actuated by an array of vertical comb actuators disposed underneath the membrane. Use of vertical comb actuators can provide higher force for a given applied voltage than the parallel plate electrostatic actuators used in other continuous-face-sheet designs.

In contrast to the continuous-face-sheet designs discussed above, segmented DM designs divide the DM aperture into a number of generally planar mirror segments, the angle and height of each segment being controlled by a number of actuators. Segmented designs are advantageous in that they allow the area of influence of each actuator to be tightly confined, simplifying the problem of driving the mirror to a particular desired deformation. Segmenting the mirror surface also eliminates the need to deform a comparatively inflexible optical reflector to produce a desired DM surface shape. Rather, the individual mirror segments are tilted, raised and lowered to form a piecewise approximation of whatever deformation is required to correct the aberrations of the incoming wavefront. Segmenting the surface can therefore result in a lower force requirement for a given surface deformation, enabling the high-stroke DMs that are needed for many AO applications.

A number of inventors have disclosed segmented DM designs that may be constructed using microfabrication techniques. U.S. Pat. No. 6,175,443 to Aksyuk et al. (2001) discloses an array of conductive mirror elements, connected together by linking members that act as supports, suspending the mirror array above an actuating electrode. These linking members also serve to keep the mirror array in an approximately planar configuration when no actuating voltage is applied. Energizing the electrode results in an attractive force between it and the mirror segments, deforming the array into a curved configuration.

U.S. Pat. No. 6,028,689 to Michalicek et al. (2000) discloses an array of mirror segments attached to a substrate by posts, each segment capable of tilting about two axes and also moving vertically, perpendicular to the array, under the influence of applied control voltages.

U.S. Pat. No. 6,545,385 to Miller et al. (2003) discloses methods for elevating a mirror segment above a substrate by supporting it on flexible members that can bend up out of the substrate plane. This provides a large cavity underneath the mirror segment, not limited by the thickness of the sacrificial materials used in its fabrication, and offering the potential for large mirror stroke.

Helmbrecht, in "Micrmirror Arrays for Adaptive Optics", PhD. Thesis, University of California, Berkeley (2002), discloses a segmented DM for use in AO applications, that exhibits high fill-factor, high mirror quality and offers the potential for high mirror stroke.

SUMMARY OF THE INVENTION

It is therefore an object of the present invention to provide improved methods and structures for elevating a platform above a substrate and for precisely controlling the tip, tilt and piston motion of that platform.

A further object of the invention is to provide a high-degree-of-freedom DM which can be used to compensate for large optical wavefront aberrations, without the need for temperature control or monitoring.

Another object of the invention is to provide a high-degree-of-freedom, high-stroke DM with integrated control electronics in a small form-factor configuration.

A further object of the invention is to provide a high-degree-of-freedom, high-stroke DM with integrated sense electronics in a small form-factor configuration.

Yet another object is to provide a high-degree-of-freedom DM with a greatly reduced control-pin count.

A further object of the invention is to provide a small-form-factor DM that can be used in clinical ophthalmic instruments to correct wavefront aberrations of the human eye.

A further object of the invention is to provide a high-degree-of-freedom, high-stroke DM that can be fabricated at low cost.

A further object of the invention is to provide a temperature-insensitive, high-fill-factor, segmented piston-tip-tilt DM, having segments with improved optical flatness.

Yet another object of the invention is to provide a highly-reliable DM, capable of operating over many millions of actuation cycles.

A further object of the invention is to provide a high-degree-of-freedom DM comprising actuators that may be operated largely independently, in order to provide correction for different areas of an optical wavefront.

A further object of the invention is to provide a DM that can be batch fabricated using IC-compatible fabrication methods and materials.

A further object of the invention is to provide a high-degree-of-freedom DM with reduced power consumption.

In accordance with the above objects, the invention, roughly described comprises an apparatus including a substrate and a platform elevated above the substrate and supported by curved flexures, wherein the curvature of said flexures results substantially from variations in intrinsic residual stress within said flexures.

In another embodiment, the invention comprises a tiled array of mirror segments, each supported by a number of curved flexures attached, at one end, to the underside of the segment and, at the other end, to a substrate. A number of independently addressable actuators are used to apply forces to each mirror segment, causing it to move in a controlled manner. The application points of the actuating forces and the locations of the support flexures are placed so as to allow each segment to be tilted about two distinct axes substantially parallel to the substrate and translated along an axis substantially perpendicular to the substrate. The invention may optionally include electronic circuits embedded in the substrate for the purpose of addressing the individual actuators and/or sensing the state of a given mirror segment. The invention includes methods and structures for improved flexures for supporting and elevating the segments above the substrate. More particularly, the invention provides methods and apparatus for fabricating mirror segments supported by curved flexures, the curvature of which is induced, principally or entirely, by variations in intrinsic residual stress through the thickness of the flexure material or materials. The invention also includes methods for separately fabricating the MEMS portion of the inventive apparatus and the electronics portion, and then integrating the two to form the apparatus.

BRIEF DESCRIPTION OF THE DRAWINGS

FIG. 4A: Flow diagram of the process steps required to fabricate a first embodiment of the invention.

FIG. 4B: Schematic cross-sections through structures fabricated at various process steps in a first embodiment of the invention.

FIG. 5: Schematic cross-section through the MEMS structures for a single mirror segment in a first embodiment of the invention.

FIG. 6: Schematic cross-section through the portion of the CMOS substrate underlying a single mirror segment in a first embodiment of the invention.

FIG. 7A: Schematic cross-section through a single mirror segment and underlying structures before MEMS release and passivation layer removal in a first embodiment of the invention.

FIG. 8: Table of coefficients of thermal expansion for several candidate materials for construction of curved flexures.

DETAILED DESCRIPTION

Methods and structures for elevating one or more platforms above a substrate and for controlling the tip, tilt and piston motion of those platforms with high precision are hereinafter described. Several embodiments are described in which a plurality of such platforms are tiled to form a large-stroke segmented piston-tip-tilt deformable mirror.

Figure 3A:
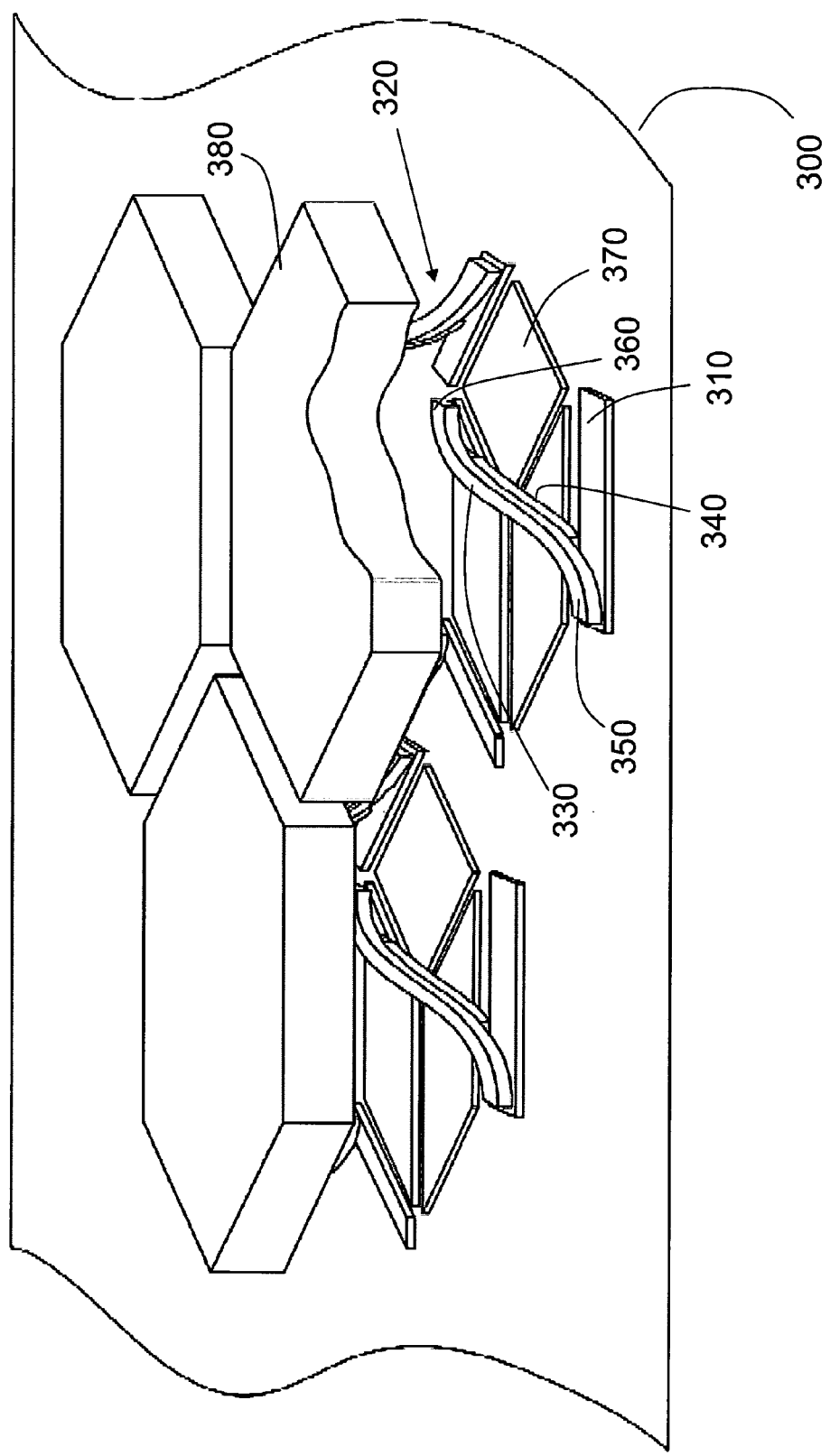
FIG. 3A: Partial cutaway perspective view of a first embodiment of the invention.

FIG. 3A shows a partial cutaway perspective view of a first embodiment of a DM incorporating the improved methods and structures. The DM is formed on a substrate 300, which may be a silicon wafer or chip containing embedded addressing and sensing circuits (not shown). On top of the substrate 300 are formed a number of control electrodes 370 that are electrically isolated from one another and electrically connected to the embedded addressing and sensing circuits. In the first embodiment, the control electrodes 370 are arranged in groups of three and are rhombic in shape, so that the footprint of each group is essentially hexagonal. Disposed around each group of three control electrodes 370, are three conductive ground pads 310, fabricated from the same material as the control electrodes 370. The ground pads 310 are electrically isolated from the control electrodes 370 and electrically connected to a ground plane or to circuits embedded in the substrate 300. Attached to one end of each ground pad 310 is a first anchor portion 350 of a flexure 320. The flexure, in the first embodiment comprises two layers, a first flexure layer 330 formed from conductive polycrystalline silicon and a second flexure layer 340 formed from silicon nitride (SixNy). The first anchor portion 350 is both mechanically and electrically connected to the ground pad 310 so that the conductive first flexure layer 330 is held at the same electrical potential as the ground pad 310. The second flexure layer 340 is rigidly attached to the underside of the first flexure layer 330 and extends over a portion of the length of the flexure 320. The purpose of the second flexure layer is to provide a residual stress difference between the top and bottom portions of the flexure 320, causing the flexure 320 to bend up out of the plane of the substrate 300.

Figure 3B:
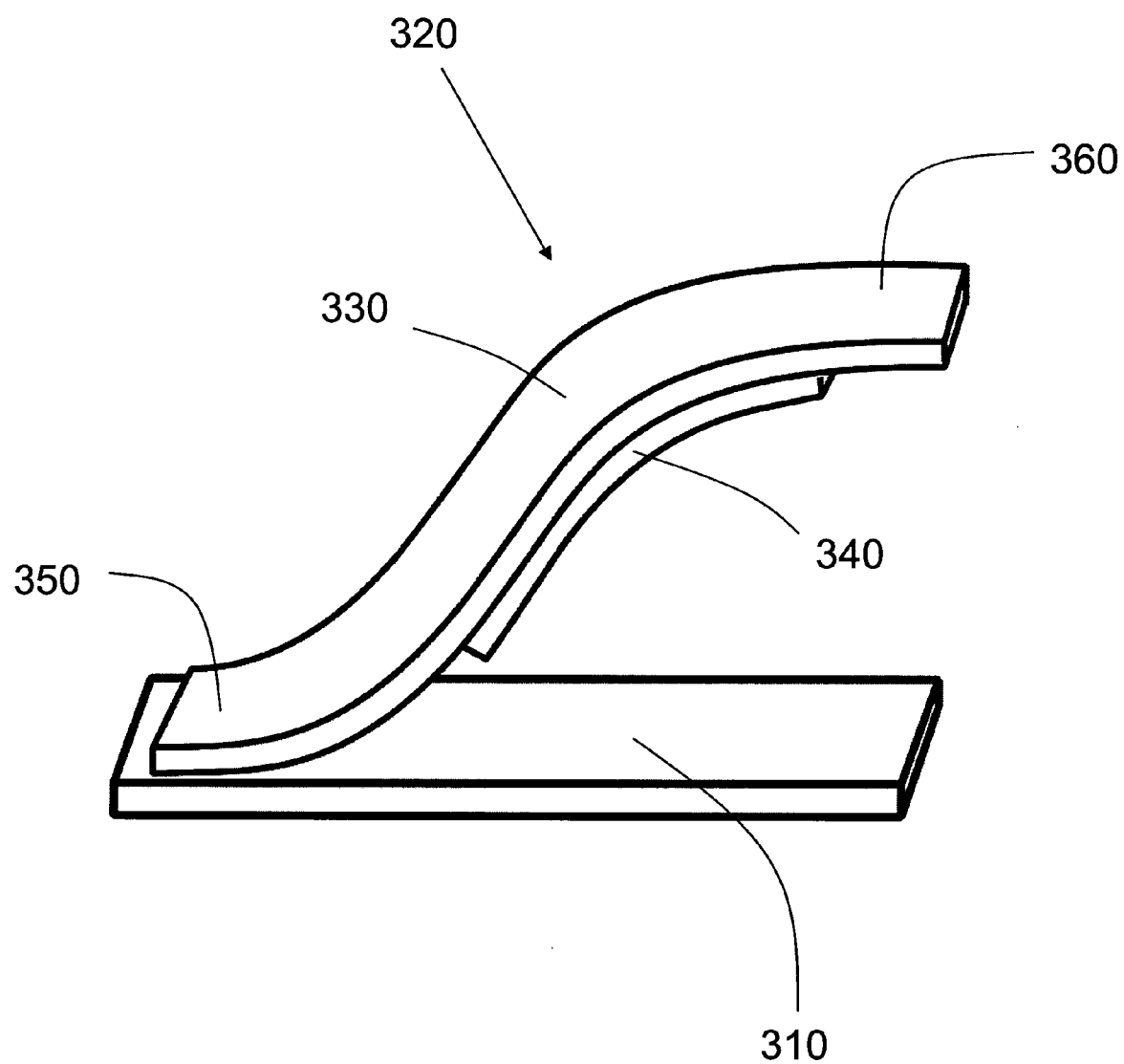
FIG. 3B: Perspective view of the improved flexure according to a first embodiment of the invention.

The end of the flexure 320 opposite the first anchor portion 350 terminates in a second anchor portion 360. FIG. 3B is a detail perspective view of one flexure 320, showing the first anchor portion 350, the second anchor portion 360, the first flexure layer 330, the second flexure layer 340, and the ground pad 310 underlying the flexure.

Referring again to FIG. 3A, the second anchor portion 360 is mechanically and electrically connected to the underside of a mirror segment 380. The mirror segment is any one individual mirror of the DM device. Thus the mirror segment 380 is held at some elevation above the substrate 300. In the first embodiment, this elevation is on the order of 50 micrometers. The mirror segment is electrically conductive and therefore is held at the same potential as the ground pad 310. In the first embodiment, the mirror segment 380 is hexagonal in shape and is formed from a 20 micrometer-thick layer of single crystal silicon and is coated on its top surface with an optical coating, which may be a highly reflective metal layer. The mirror segment diameter in the first embodiment is on the order of 500 micrometers.

For the sake of clarity, FIG. 3A shows only three mirror segments 380. However, an exemplary embodiment of the DM comprises an array of 121 nominally identical elevated mirror segments 380 disposed over the substrate so as to form a larger, segmented mirror surface, approximately circular in outline and having inter-segment gaps of 5 micrometers.

The following is a general overview of the process of the current invention for fabricating the first embodiment of the DM. The process involves separately fabricating the MEMS structure and the addressing and sensing circuits on two separate wafers, then assembling them together as shown in FIGS. 4A and 4B. FIG. 4A is a process flow diagram and FIG. 4B illustrates the corresponding structure at each step. As shown at step 400, each mirror segment 380 is fabricated by reactive ion etching (RIE) the top single crystal silicon "device" region of a bonded silicon-on-insulator wafer (BSOI). At step 405, the wafer is then coated with a sacrificial layer to fill the trenches left by the previous etch, provide a temporary support for various mechanical structures of the DM, and optionally to act as a dopant source for undoped polysilicon regions. This sacrificial layer might typically be phosphorus-doped silicate glass deposited by low pressure chemical vapor deposition (LPCVD). Alternatively, in cases where the sacrificial layer is not required to act as a dopant source, silicon oxide deposited by a tetraethoxysilane (TEOS) process might be used.

As shown at step 410, the PSG region is next patterned to define the attachment points for the second anchor portions 360 of the flexures; in some instances the patterning may include an etching step. At step 415, a one micron undoped amorphous polysilicon layer and a PSG layer are deposited by LPCVD and annealed at 950° C. for six hours to dope and tune the residual stress of the polysilicon layer to approximately −40 MPa, where the negative sign denotes compressive stress. The top PSG layer is then removed at step 420 using a wet hydrofluoric (HF) acid etch and the polysilicon layer is patterned and etched to define the first flexure layer 330 at step 425. Silicon nitride (SixNy) is then deposited by LPCVD at step 430, and patterned and etched to define the second flexure layer 340 at step 435. At step 437, conductive metal pads are deposited, for example by electroplating, on to the first anchor portion 350 of the flexures. These metal pads will serve as the electrical and mechanical attachment points between the flexures and the substrate 300.

Figure 1:
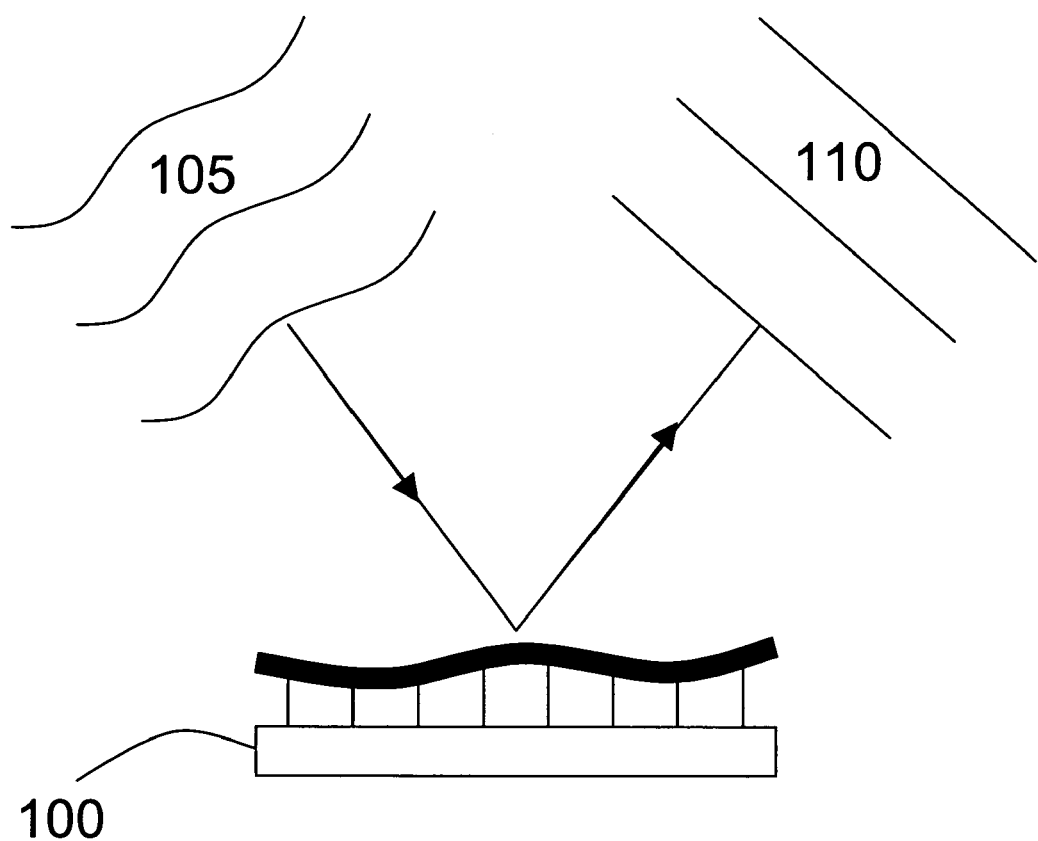
FIG. 1: Illustration of prior art use of a deformable mirror to correct an aberrated wavefront.
Figure 2:
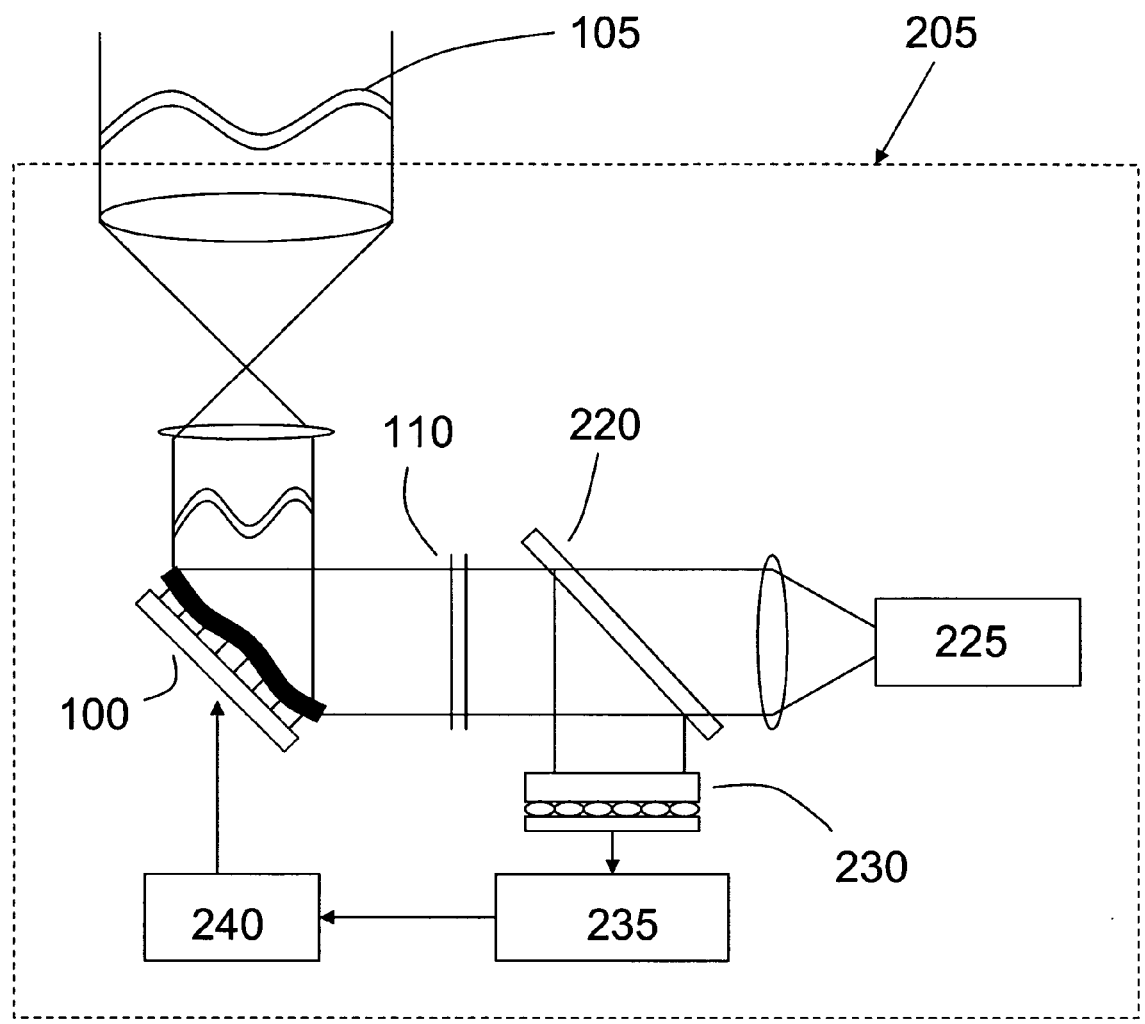
FIG. 2: Illustration of prior art adaptive optic (AO) system.

FIG. 5 schematically illustrates a cross-section through the MEMS structure 500 supporting a single mirror segment, completed up to this point and including the mirror segment 380, flexure 320 and the sacrificial layer 515, typically phosphorus-doped silicate glass (PSG). As compared with the structure shown at the last step 437 of FIG. 4B-1, the structure shown in FIG. 5 has been inverted in preparation for bonding to the electronics chip. In the first embodiment, the flexure 320 is a two-layer structure with a first flexure layer 330 of phosphorus-doped polysilicon, and a second flexure layer 340 of SixNy. Although not required in all embodiments, the MEMS device in the first embodiment includes a temporary handle wafer (not shown in FIG. 5), typically 300 to 500 micrometers thick, used to support the MEMS structure prior to release in a manner known in the art.

Continuing again with reference to process steps 445 onwards, shown in FIGS. 4A and 4B, drive circuitry in the form of an integrated circuit is now introduced. This integrated circuit is the substrate 300 on which the flexures and mirror segments will be mounted. The substrate 300 is typically fabricated through separate processing in a conventional manner, for example using silicon CMOS techniques not shown here, and well known in the art. As shown at step 445 in FIG. 4, the substrate 300 is typically coated with a passivation layer to protect it from the MEMS release agent, which may for example be hydrofluoric acid. As shown in step 447 of FIG. 4, the passivation layer is patterned and etched to expose bond sites on the substrate 300 that are electrically connected to a ground plane or to underlying circuits. An electrically conductive bonding agent 610 is then deposited on these bond sites. FIG. 6 is a schematic cross-section through the substrate at the end of step 447, showing the locations of the control electrodes 370, the bonding agent 610 and the wiring layer 625.

Continuing to refer to FIG. 4, at step 450 the MEMS structure 500, constructed as described above, is disposed over the substrate 300 and the two are then bonded together. At this point the MEMS structure 500 still includes the sacrificial layer 515.

Figure 7B:
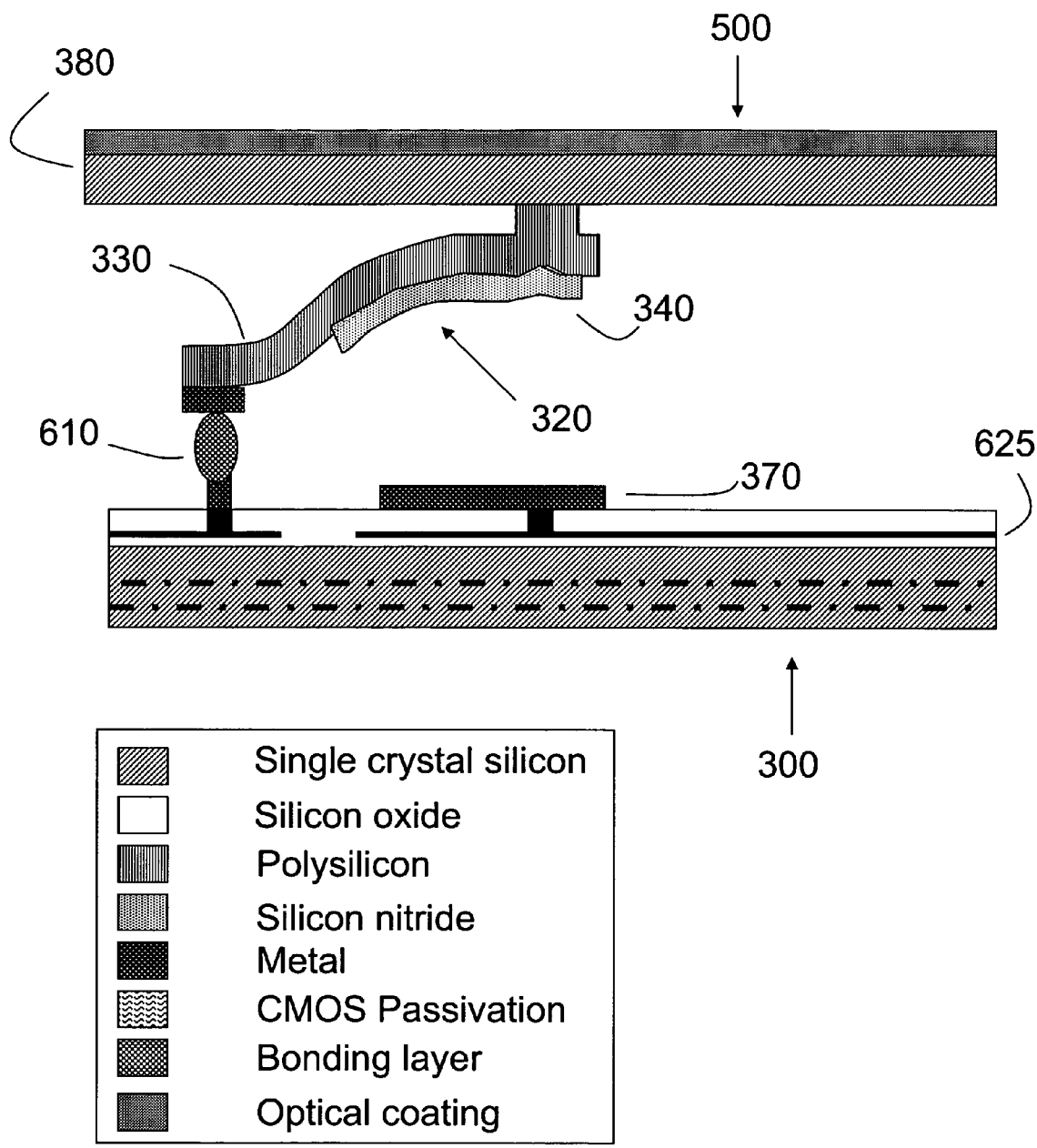
FIG. 7B: Schematic cross-section through a single mirror segment and underlying structures after MEMS release and passivation layer removal, in a first embodiment of the invention.

At step 455 the handle wafer of the BSOI wafer is etched away from the MEMS mirror segment, after which the sacrificial layer is released from the MEMS structure as shown at step 460. The IC passivation layer is removed at step 465, typically using an O2 plasma or appropriate solvent. Finally, an optical coating is deposited on the top surface of the mirror segments, for example using a shadow-masked metal evaporation, in step 470. The resulting device is a completed, integrated DM. FIG. 7A shows a cross-section through a single mirror segment and underlying structures, after removal of the handle wafer at step 455. FIG. 7B shows a cross section through the same structure at the end of the fabrication process, after the MEMS sacrificial layer 515 and circuitry passivation layer have been removed. The device includes the following elements: IC portion or substrate 300 and MEMS structure 500; on the IC portion are shown a control electrode 370, the bonding agent 610 and a wiring layer 625. On the MEMS portion 500 are shown the mirror segment 380 and flexure 320, comprising the first flexure layer 330 and second flexure layer 340.

One important aspect of the present invention is the above-described passivation layer. In the first embodiment of the invention, an electrically-conductive contact must be established through the passivation layer at the points where the MEMS structure 500 is bonded to the substrate 300. The bonding process can be any suitable process that results in a conductive bond, for example gold to gold bonding. To allow the bond material to be deposited onto the IC substrate 300, the passivation layer is preferably patternable. In an exemplary arrangement, the passivation layer is completely removable after the MEMS structure is released in a manner that will not damage the MEMS structure. This passivation material may be a protective polymer material such as a polyimide or parylene.

Alternatively, the passivation material can be conductive so that upon removal from the exposed surfaces, electrical contact between the ICs and MEMS element is maintained. The passivation material need not be patterned before bonding as it is selectively removed, where not bonded to the MEMS structures, in the passivation layer removal process. A conductive polymer or epoxy can be used, for example, EPO-TEK OH108-1 or other similar conductive epoxy made by Epoxy Technology, Inc., of Billerca, Mass.

The present invention differs significantly from the prior art in that it relies on the influence of IRS (as opposed to CTE) in the flexures to elevate the mirror segments above the substrate plane, to a much greater degree than has been found in the prior art. The "Coefficient of thermal expansion" ("CTE") describes the linear change in size of a material as a function of temperature, while "Intrinsic residual stress" (IRS) describes the stress in a material, which is dependent on the grain morphology and crystalline defects of a material. This means that the elevation of the segments above the substrate can be far less sensitive to changes in temperature than for comparable prior art devices. The deflection at the elevated end of each flexure is essentially proportional to the curvature of the flexure, which may be written as the sum of two components; a first component proportional to the intrinsic residual stress in the flexure and a second component proportional to the CTE mismatches in the flexure. In the first embodiment of the invention, the first flexure layer is composed of polysilicon and the second flexure layer is composed of silicon nitride. This provides a flexure for which the IRS component is larger than the CTE component by a factor of approximately one thousand at normal operating temperatures, for example in the range 0–100 degrees Celcius.

Many alternative embodiments of the flexure are possible in which the second flexure material is one with a CTE similar to that of the first flexure material. If that first material is polysilicon, the second material can be a ceramic, such as SiC, or silicon nitride (SixNy), or even polysilicon itself, deposited under different conditions so as to induce a different grain structure and crystal defect concentration, and thus different IRS. FIG. 8 is a table that lists the CTE of some example materials.

In contrast to the prior art usage of nickel, SixNy is advantageous because it does not contaminate etchers as Ni does. SixNy is also easier to process because it is a standard IC material deposited by LPCVD. The residual stress of SixNy can be controlled by varying the ratios of the reactant gasses, deposition pressure, and the deposition temperature. For example, a layer deposited with a gas flow ratio of 1:3 dichlorosilane to ammonia at 125 mTorr and 800 will yield a stoichiometric film (Si3N4) with approximately 1 GPa of residual tensile stress, while 4:1 gas ratio at 140 mTorr and 835° C. will yield a film composition near Si3N3 with approximately 280 MPa of residual tensile stress. To achieve the desired radius of curvature of the flexure, different SixNy stoichiometries can be used, the appropriate choice for which may be application-specific.

The first embodiment of the DM comprises a tiled array of mirror segments, supported on flexures and elevated approximately 50 micrometers above the substrate. As described, the substrate contains electronic circuits used for controlling and sensing the tip, tilt and piston motion of the segments. The circuits are controlled via electrical signals transmitted, for example, through bond pads on the substrate and generated, for example, by a microprocessor in a manner well known in the art. The control signals typically contain information, generated by a wavefront reconstructor, about the combination of tip, tilt and piston motions for each mirror segment needed to compensate for the wavefront aberrations at a given time. "Piston movement" is one of three types of movement used to describe actuation of a mirror segment, and describes translation normal to the plane of the DM aperture. "Tilt", the second type of movement, is movement about any first axis that is parallel to the plane of the DM aperture. "Tip", the third type of movement, is movement about any second axis (not parallel to the first axis) that is also parallel to the substrate.

The circuits embedded in the substrate 300 decode this information and translate it into a corresponding set of voltages that are applied to the control electrodes disposed under each mirror segment. The electrical potential difference and resulting electrostatic force between each mirror segment and its three control electrodes causes it to move in tip, tilt and piston, and assume a position and orientation determined by the voltages applied to the three electrodes. This ability to independently orient and position each segment allows spatially complex wavefront aberrations to be corrected by the DM. In some implementations of the first embodiment, the substrate also contains sense electronics that detect the tip, tilt and piston of each segment, for example by measuring the capacitance between the segment and its three control electrodes. Incorporation of sense electronics can improve the resolution with which the segments can be controlled. Because the attractive force between a segment and its control electrodes increases rapidly as the gap between them diminishes, the control voltages must be limited to avoid pulling segments into contact with the electrodes. Typically, the maximum operation voltage is chosen to be the voltage that causes a segment to travel 25% of the elevation produced by the flexures. Therefore, the flexure elevation of 50 micrometers described in the first embodiment results in a useable mirror stroke of approximately 12 micrometers.

In a second embodiment of the invention, the structure of the DM is identical to the structure of the first embodiment, except that the ground pads and control electrodes are formed on the MEMS part rather than the CMOS part. The appearance of the completed device is essentially identical to that of the first embodiment, illustrated in FIG. 3A.

Fabrication of the second embodiment proceeds in a manner identical to that used for the first embodiment up to step 435 of FIG. 4B. A sacrificial layer is then deposited, patterned and etched to open up anchor points where the ground pads 310 will attach to the first anchor regions 350 of the flexures. A layer of polysilicon is then deposited, patterned and etched to define the ground pads 310 and the control electrodes 370. A layer of metal is then deposited, patterned and etched so that it coats the surfaces of the ground pads 310 and control electrodes 370, but does not bridge unconnected structures.

The CMOS portion 300 of the device is fabricated in the same way as for the first embodiment, but has bond sites in locations that correspond to both the ground pads 310 and the control electrodes 370 of the MEMS structure. The ground pad bond sites are electrically connected to a ground plane or to circuits in the substrate 300, while the control electrode bond sites are connected to the appropriate control and sense circuits within the substrate 300. The MEMS portion and the CMOS portion are bonded together using a film of anisotropic conductive polymer that conducts only in a direction normal to the plane of the film. In this embodiment, the anisotropic conductive polymer acts as both a bonding agent and a CMOS passivation layer. After bonding, the MEMS structures are mechanically released, for example by HF etching, as in the first embodiment. Because of the anisotropic nature of the polymer, it does not need to be removed from the DM and so the passivation layer removal step is omitted for this embodiment. As for the first embodiment, the final step is the deposition of an optical coating on the top surface of the mirror segments.

The method of operation for the second embodiment is identical to that for the first embodiment.

Figure 9:
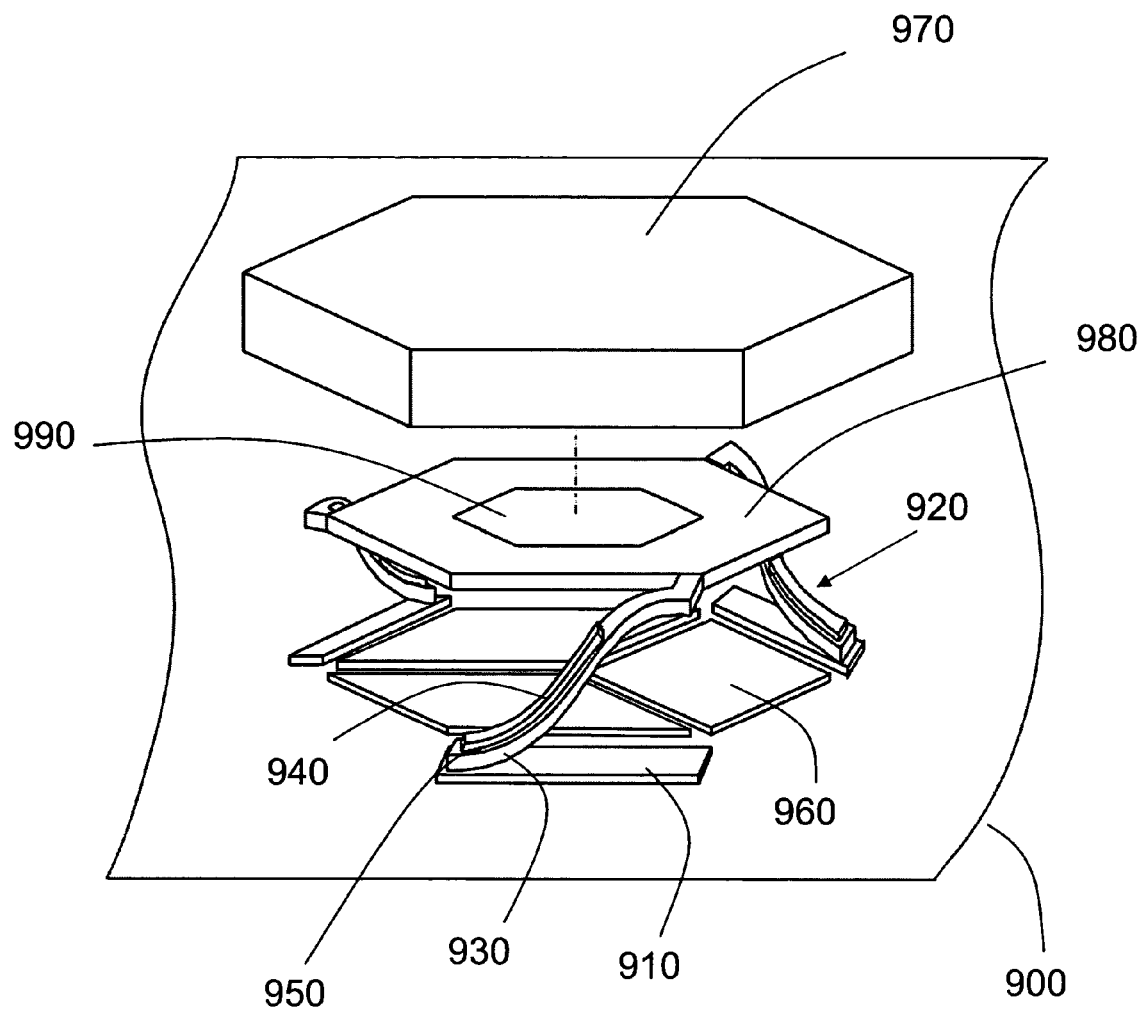
FIG. 9: Partially exploded perspective view of a third embodiment of the invention.

FIG. 9 shows the mechanical structure of a DM according to the third embodiment of the invention, in a partially exploded perspective view. For the sake of clarity, FIG. 9 shows only a single piston-tip-tilt mirror segment. However, it will be clear to one skilled in the art that multiple such mirrors may be fabricated side-by-side on a single substrate to form a segmented DM, as was described for the first embodiment.

The third embodiment of the DM comprises a substrate 900, which may be a silicon wafer. On top of the substrate 900 are formed a number of control electrodes 960 that are electrically isolated from one another and electrically connected to conductive traces (not shown in FIG. 9) that may either be embedded in the substrate 900 or attached to the surface of the substrate 900. These traces electrically connect the control electrodes 960 directly to bond pads (not shown in FIG. 9) that may be disposed around the perimeter of the DM chip. The control electrodes 960 are arranged in groups of three and are rhombic in shape, so that the footprint of each group is essentially hexagonal.

Disposed around each group of three control electrodes 960, are three conductive ground pads 910, fabricated from the same material as the control electrodes 960. The ground pads 910 are electrically isolated from the control electrodes 960 and electrically connected to a ground plane embedded in the substrate 900. Attached to one end of each ground pad 910 is a first anchor portion 950 of a flexure 920. The flexure, in the third embodiment comprises two layers, a first flexure layer 930 formed from conductive polycrystalline silicon and a second flexure layer 940 formed from silicon nitride. The first anchor portion 950 is both mechanically and electrically connected to the ground pad 910 so that the conductive first flexure layer 930 is held at the same potential as the ground pad 910. The second flexure layer 940 is rigidly attached to the top side of the first flexure layer 930 and extends over a portion of the length of the flexure 920. The purpose of the second flexure layer is to provide a residual stress difference between the top and bottom portions of the flexure 920, causing the flexure 920 to bend up out of the plane of the substrate 300.

The end of the flexure 920 opposite the first anchor portion 950 is electrically and mechanically connected to a hexagonal platform 980. A platform bond site 990, fabricated from a metal, is electrically and mechanically connected to the platform. This platform bond site matches up with a corresponding segment bond site, also fabricated from a metal, on the underside of a mirror segment 970. The segment bond site is not visible in FIG. 9, since it is on the underside of the mirror segment 970. In the fully assembled DM, the mirror segment 970 is mechanically and electrically connected to the platform 980 via these bond sites. Thus the mirror segment 970 is held at some elevation above the substrate 900. In the first embodiment, this elevation is on the order of 50 micrometers. The mirror segment is electrically conductive and therefore is held at the same potential as the ground pad 910. In the third embodiment, the mirror segment 970 is hexagonal in shape and is formed from a 20 micrometer-thick layer of single crystal silicon and is coated on its top surface with an optical coating, which may be a highly reflective metal layer. The mirror segment diameter in the third embodiment is on the order of 500 micrometers.

In the third embodiment, the DM does not incorporate drive and sense electronics, but does incorporate the improved bimorph flexure. The actuator substrate 900 is fabricated in a method similar to that used to fabricate the MEMS portion of the first embodiment, but where the starting material is a standard silicon wafer rather than a bonded SOI wafer. The ground pads 910, control electrodes 960, electrical traces and bond pads are defined in a first undoped polysilicon layer, deposited on an insulating silicon nitride layer. Alternatively, the traces could be fabricated in a buried layer beneath the electrodes that is electrically isolated in all regions except areas that contact the electrical traces to electrodes and bond pads. A phosphorous-doped silicate glass (PSG) sacrificial layer is then deposited, patterned and etched to open up regions where the first anchor portion 950 of the flexures will connect to the ground pads 910. A second undoped amorphous polysilicon layer is then deposited followed by a PSG layer. The wafer is annealed at 950° C. for six hours to dope and tune the residual stress of the second polysilicon layer to approximately −40 MPa. In this step, the sacrificial PSG layer also dopes the first layer of polysilicon. The top PSG layer is then removed using a wet HF acid etch and the second polysilicon layer is patterned and etched to define the first flexure layers 930 and platforms 980. A layer of silicon nitride is then deposited, patterned and etched to define the second flexure layers 940, after which a low-temperature oxide (LTO) is deposited by LPCVD to protect the structures from a later etch. The LTO layer is etched and a metal layer is selectively deposited, for example by electroplating, to form the bond sites 990 and bond pads disposed around the perimeter of the DM chip.

The mirror segments 970 are formed on a separate wafer, typically a BSOI wafer with a 20 micrometer thick device layer. The mirror segments are defined using deep reactive ion etching, followed by deposition of a sacrificial layer (typically PSG) that refills the trenches between the segments. The sacrificial layer is then patterned and etched to clear access holes for bond sites that match those deposited on the actuator substrate 900. A metal layer is then selectively deposited, for example by evaporation and lift-off, to form the segment bond sites that will be joined to the corresponding platform bond sites 990.

The actuators and mirror segments are then assembled and bonded together, for example using gold to gold bonding. The mirror-segment handle wafer is then removed in a manner known to those skilled in the art, and the sacrificial layers are removed, for example by HF etching, to allow the flexures to lift the mirror segments 970 above the substrate 900. Finally, an optical coating is deposited on the top surface of the mirror segments.

The third embodiment is operated in a manner similar to the first embodiment, with the exception that the control voltages used to set the orientation and piston of the mirror segments are generated by driver electronics on a chip or board that is physically separate from the DM chip. The control electrodes for each mirror segment are connected to the outputs of the drive electronics for example via bond wires electrically connected to the bond pads disposed around the edges of the DM chip.

Accordingly, the invention provides improved methods and structures for elevating a number of platforms above a substrate and for controlling the piston, tip and tilt motions of those platforms. The resulting structures feature low temperature dependence, small size and power consumption and high control precision. The methods and structures may be used to construct an improved deformable mirror (DM) that features low temperature dependence, high fill-factor, high control resolution and large stroke, and which can be fabricated in a small form-factor at low cost. The ability to integrate drive and sense electronics on the same chip as the mirror segments allows DMs with large numbers of actuators to be realized. The structures and methods for producing temperature-insensitive elevated mirror segments and the structures and methods for assembling the mirror segments on to control and sense electronics can be applied separately or in combination.

Although the description above contains many specificities, these should not be construed as limiting the scope of the invention but as merely providing illustrations of some of the possible embodiments of this invention. For example, the mirror segments can have other shapes, such as square, rectangular, triangular etc.; the mirror segments can be supported by different numbers of flexures; the flexures can be constructed from any number of materials and comprise any number of layers, provided their curvature is predominantly caused by IRS, rather than CTE differences; the tip, tilt and piston of the mirror segments can be controlled by varying the duty cycle of an AC signal applied to the control electrodes rather than the magnitude of an applied DC signal; the thicknesses of the layers that comprise the DM can be varied; the diameters or widths of features such as the mirror segments, flexures and control electrodes can be varied; the number and placement of the control electrodes under each segment can be changed; the elevation of the mirror segments above the substrate can be altered; the actuators need not be electrostatic but could be, for example, piezoelectric or magnetic; the gaps between mirror segments can be changed; different reflective coatings including both metallic and dielectric coatings can be deposited on the top surface of the segments; different materials and methods can be used to bond the MEMS portion to the CMOS portion; different passivation materials can be used to protect the CMOS circuits during MEMS release; the number of mirror segments comprising the DM can be varied, etc.

While numerous specific details have been set forth in order to provide a thorough understanding of the present invention, numerous aspects of the present invention may be practiced with only some of these details. In addition, certain process operations and related details which are known in the art have not been described in detail in order not to unnecessarily obscure the present invention.

Thus the scope of the invention should be determined by the appended claims and their legal equivalents, rather than by the examples given.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A microelectromechanical (MEMS) structure on a substrate, comprising:
    a platform connected with a set of one or more bimorph flexures; and
    the set of bimorph flexures connecting the platform with the substrate, each bimorph flexure comprising a first layer comprised of a first material and a second layer comprised of a second material, the first and second materials having particular intrinsic residual stress (IRS) characteristics and coefficients of thermal expansion (CTEs), each bimorph flexure having a curvature resulting from a first component proportional to the difference in IRS characteristics of the first and second materials and a second component proportional to the difference in CTEs of the first and second materials, the first component being larger than the second component.

2. The MEMS structure of claim 1, wherein the curvature of each bimorph flexure results predominantly from the first component.

3. The MEMS structure of claim 1, wherein the curvature of each bimorph flexure is not substantially sensitive to changes in temperature.

4. The MEMS structure of claim 1, wherein, the first component is larger than the second component by a factor of approximately one thousand or more.

5. The MEMS structure of claim 4, wherein the first component is larger than the second component by a factor of approximately one thousand or more at normal operating temperatures of the MEMS structure.

6. The MEMS structure of claim 1, wherein the first material comprises silicon and the second material comprises silicon nitride, or the first material comprises polysilicon and the second material comprises ceramic, SiC, or silicon nitride (SixNy).

7. The MEMS structure of claim 1, wherein the second layer extends over a portion of the first layer that is less than the entire length of the first layer, the second layer being affixed to the first layer along the entire length of the second layer.

8. The MEMS structure of claim 7, wherein the second layer provides a residual stress difference between the top and bottom portions of the first layer.

9. The MEMS structure of claim 1, wherein:
    the set of bimorph flexures elevates the platform above the substrate; and
    the platform is an actuator segment or mirror segment.

10. The MEMS structure of claim 1, wherein the first and second layers are formed under conditions that produce substantially different IRS characteristics in the first and second materials.

11. The MEMS structure of claim 1, wherein the first and second materials comprise polysilicon.

* * * * *